T. PARRY & J. McHARDY.
Improvement in Brakes for Vehicles.
No. 133,248. Patented Nov. 19, 1872.
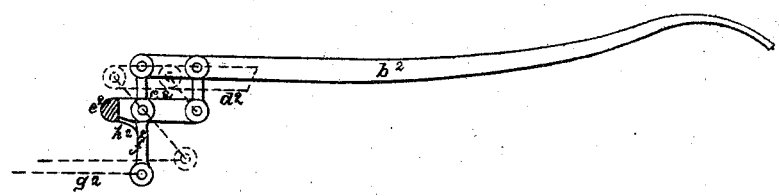
Witnesses.
Inventors.

UNITED STATES PATENT OFFICE.

THOMAS PARRY, OF BALHAM, AND JAMES McHARDY, OF EDINBOROUGH, GREAT BRITAIN.

IMPROVEMENT IN BRAKES FOR VEHICLES.

Specification forming part of Letters Patent No. 133,248, dated November 19, 1872.

*To all whom it may concern:*

Be it known that we, THOMAS PARRY, of Balham, hop merchant, and JAMES McHARDY, of Edinborough, both in the Kingdom of Great Britain, have invented a certain new and useful Improved Drag or Brake applicable to carriages, wagons, omnibuses, and other wheeled vehicles; and do hereby declare the following to be a true and exact description of the same, reference being had to the accompanying drawing and to figures and letters thereon—that is to say, Our invention relates to an improved drag or brake acted upon by levers in communication with the pole-chain of the vehicle or the chain by which the collars of horses and other beasts of burden are secured to such vehicles for the purpose of stopping or retarding the motion thereof.

Figure 1, a side view of a carriage shaft or pole with the levers for operating the brake.

In the drawing, the shafts $b^2$ of the vehicle are represented as hinged on two vertical levers, $c^2$ $d^2$, the lower joints of which are stationary and fixed to any convenient part, $e^2$, of the frame-work of the vehicle, the lever $c^2$ being continued beyond its fulcrum, and having attached to the end $f^2$ thereof the rod or chain $g^2$ communicating with the brake-gear. The effect of the horse pulling back in this case will be that the shafts or pole (which may also be suspended in the same way) will also be drawn backward, thus placing the levers $c^2$ $d^2$ in a diagonal position, as shown, the end $f^2$ being pressed forward and operating upon the brake-gear to force the brake to bear upon the wheels. The said brake-gear may be of any known or suitable construction.

This form of our invention is chiefly applicable to hansom-cabs and other two-wheeled vehicles. The joints of one or more of these levers may be connected with the tipping action of tip-carts, so that on simply extracting one of the joint-pins the cart will tip backward and empty its contents where required, and a stop or stops, $h^2$, are used to prevent the shafts being pulled too far forward.

Claim.

In combination with a shaft or pole, $b^2$, of a carriage, we claim the levers $c^2$ $d^2$, the said levers $c^2$ extending to form an arm, $f^2$, from which communication is made to the brakes, substantially as described.

Done at London, England, this 11th day of January, 1870.

THOMAS PARRY.
JAMES McHARDY.

Witnesses:
E. T. HUGHES,
   123 *Chancery Lane, London.*
HENRY ROGERS,
   123 *Chancery Lane, London.*